(12) United States Patent
Walsh

(10) Patent No.: US 6,354,557 B1
(45) Date of Patent: Mar. 12, 2002

(54) ADJUSTABLE BICYCLES SEAT HEIGHT ASSEMBLY

(75) Inventor: Austin A Walsh, Boston, MA (US)

(73) Assignee: Austin A. Walsh, Boston, MA (US)

( * ) Notice: Subject to any disclaimer, the term of this patent is extended or adjusted under 35 U.S.C. 154(b) by 0 days.

(21) Appl. No.: 09/519,336

(22) Filed: Mar. 6, 2000

(51) Int. Cl.$^7$ .............................................. F16M 13/00
(52) U.S. Cl. ....................... 248/600; 248/408; 267/182; 297/215.13
(58) Field of Search ................................ 248/600, 404, 248/408, 409, 413; 267/182; 297/196, 205, 215.13

(56) References Cited

U.S. PATENT DOCUMENTS

| 2,644,504 | A | * | 7/1953 | Vick |
| 3,861,740 | A | * | 1/1975 | Tajima et al. |
| 4,150,851 | A | * | 4/1979 | Cienfuegos |
| 4,807,856 | A | * | 2/1989 | Teckenbrock |
| 5,044,592 | A | * | 9/1991 | Cienfuegos |
| 5,713,555 | A | * | 2/1998 | Zurfluh et al. |
| 5,826,935 | A | * | 10/1998 | Defreitas |

* cited by examiner

Primary Examiner—Ramon O. Ramirez
Assistant Examiner—Korie Chan

(57) ABSTRACT

A seat post axially slides into an insert sleeve that fits into a bicycle frame in the place of a conventional seat post. The seat post has a long keyway along the front and a narrower keyway or tubular section along the posts back. Along the inner wall of the front keyway is a plurality of holes sized to receive a locking pin. Connected to the inner wall of the insert sleeve is a support key unit that slides within the front keyway of the seat post, as the seat post is moved up and down. In the support key, the height adjusting, locking pin is housed as well as a hanger is formed where one end of the elastic spring is attached. The elastic spring is then brought around a pulley positioned within the bottom portion of the seat post, brought up the rear keyway and is attached at the top of the seat post in a downward pointing hanger. The elastic spring acts as if it were attached from the bottom of the seat post to the bottom of the support key. The elastic spring urges the seat post upwards whenever the locking pin is pulled from one of the plurality of seat post holes. In another embodiment a pawl that contains a downward pointing hook and a pawl that incorporates a supplemental pin would be used instead of the simpler locking pin device. In another embodiment a coil spring is used in place of the elastic cord.

4 Claims, 4 Drawing Sheets

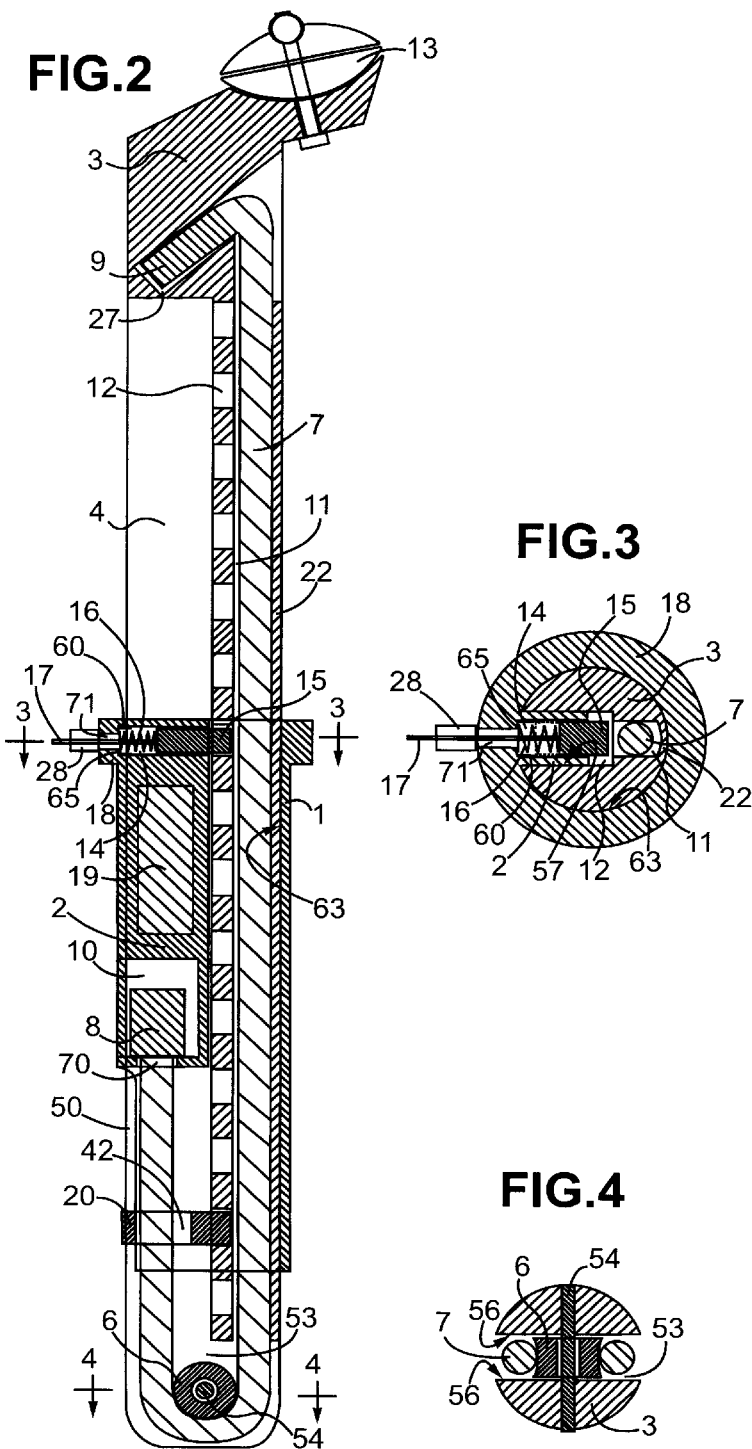
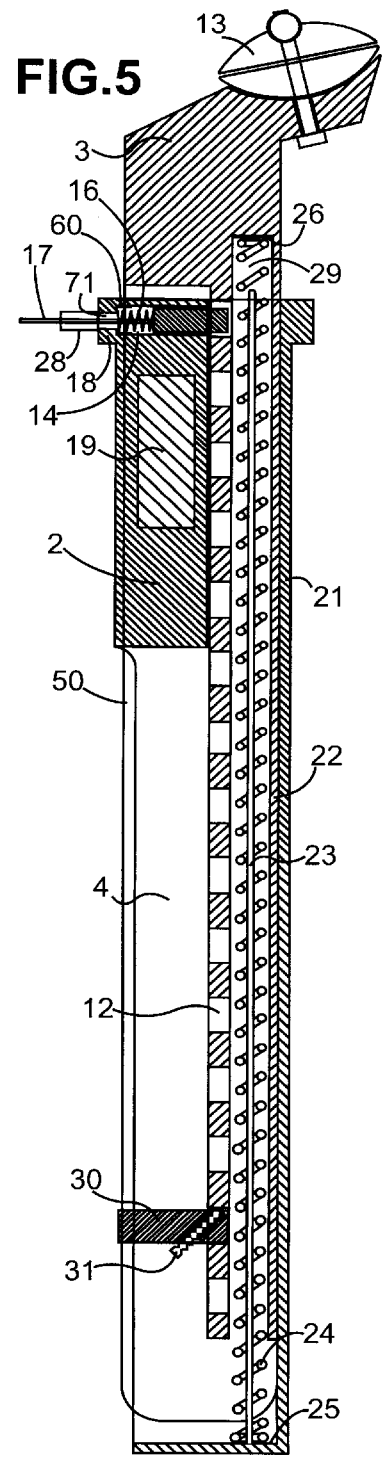

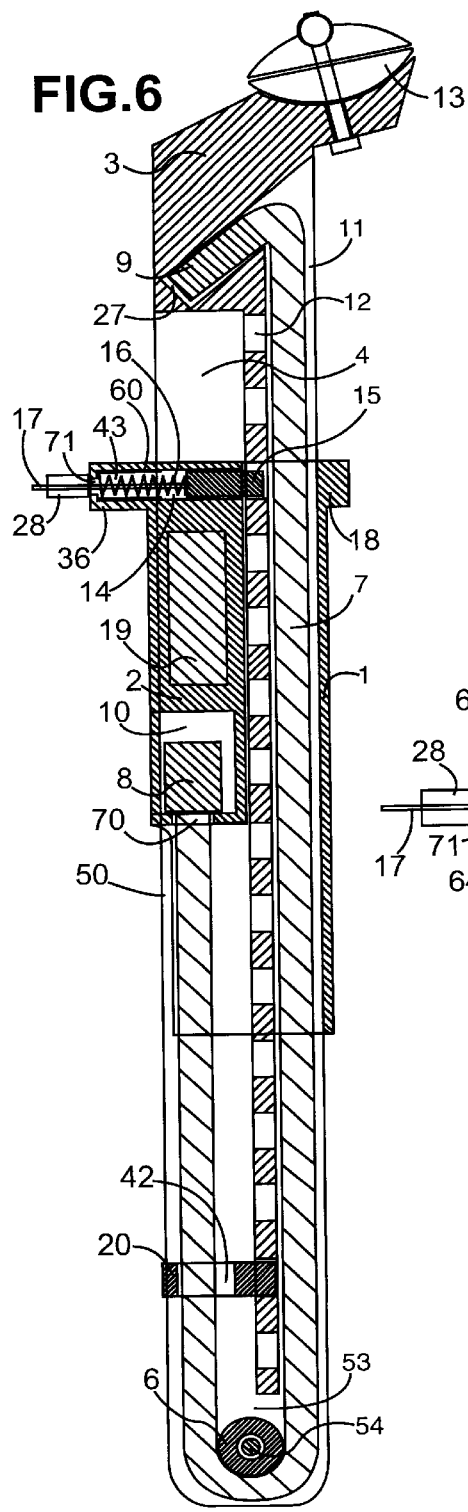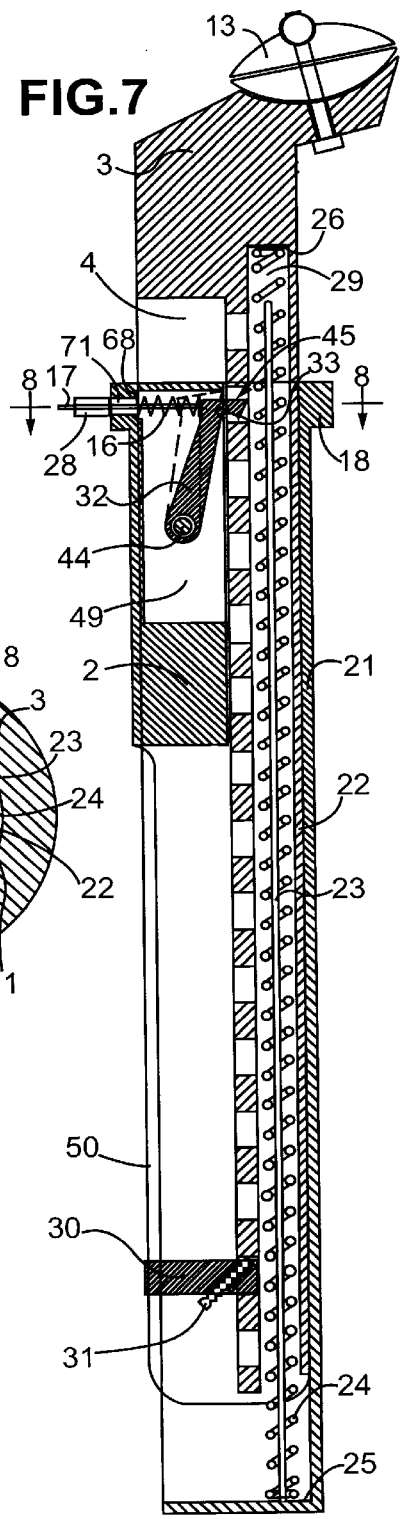

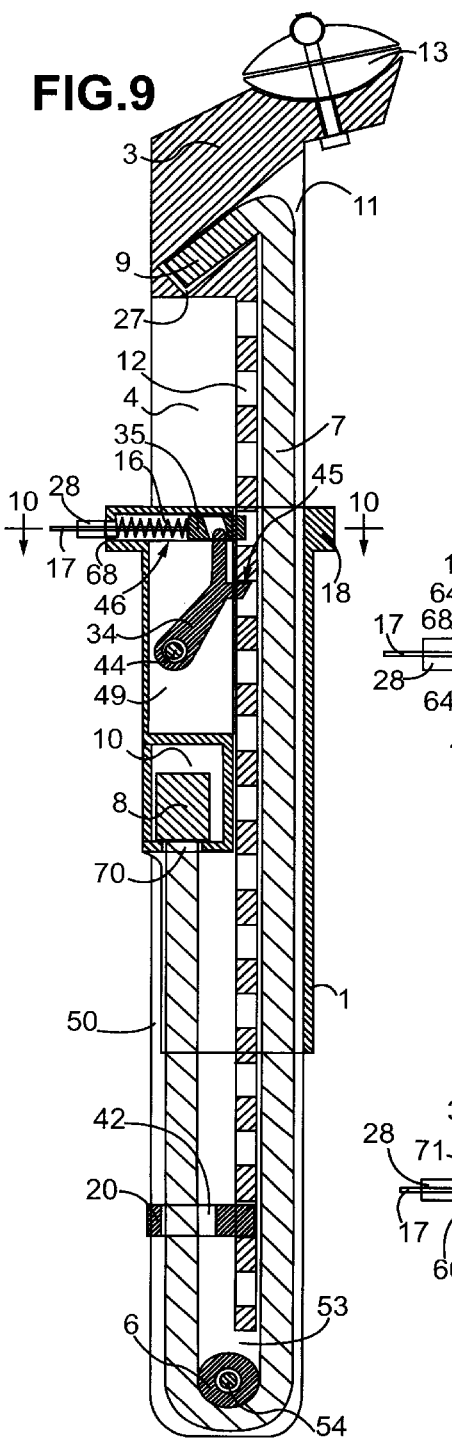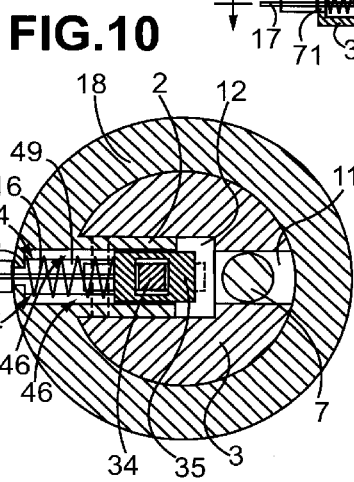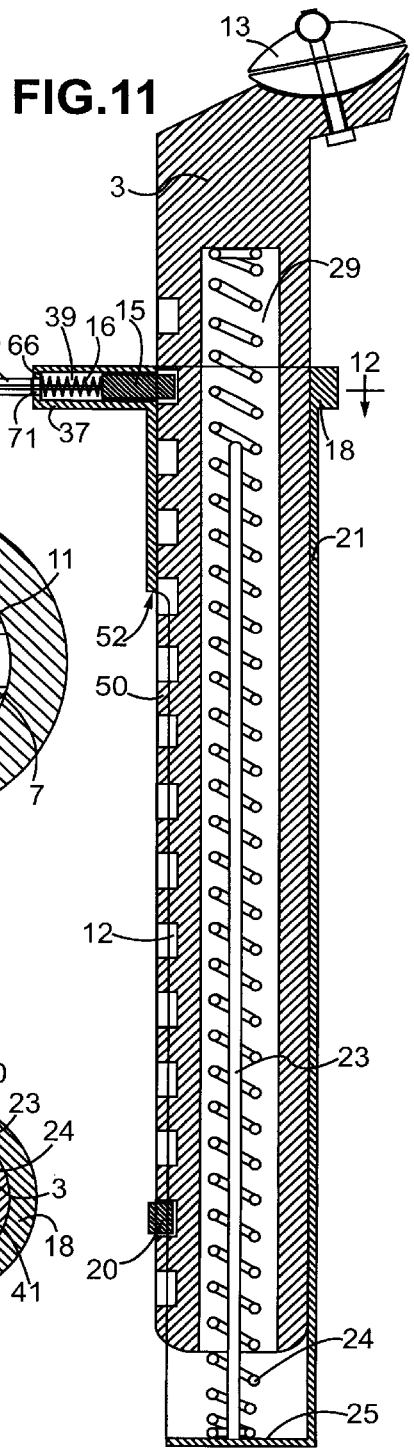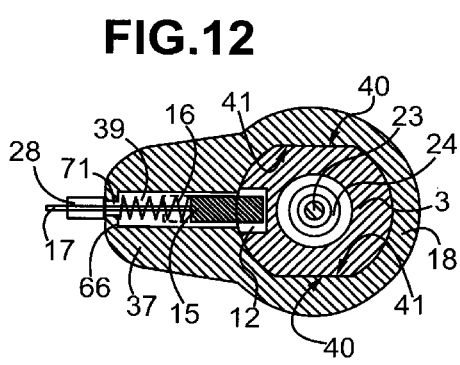

ADJUSTABLE BICYCLES SEAT HEIGHT ASSEMBLY

BACKGROUND OF INVENTION

This invention relates generally to a seat that can be rapidly raised or lowered on a bicycle while the cycle is in motion.

Bicycles require both a force to be exerted on the pedals and a capacity to balance the bicycle to keep the cyclist in motion. While the seat is positioned higher the cyclist is able to exert a greater amount of force on the pedals. Yet, the bicycle is vastly more maneuverable while the seat is down and out of the way. On many steep and bumpy surfaces the lower center of gravity, afforded by a lower seat position, is crucial to avoid being thrown off the bike. It is therefore advantageous for the seat post to be able to be quickly placed in both a lowest possible position as well as at a maximum height seat position.

A bicycle frames seat tube is generally limited in the amount of space available in which a seat post can be positioned into. With such limited space, an actuating seat post must incorporate a lifting device for the seat post that will allow the seat post to operate at a full range of seat heights.

Adjusting the height of a bicycle seat requires the cyclist not to be seated. The task of then balancing and steering the bicycle with only one hand is perilous if not extremely difficult especially when coupled with challenging terrain. Therefore, positioning the devices actuating lever on the bicycle handlebars, allowing both hands to maintain the cycles balance, is crucial for a bicycle seat height adjusting devices operational ability.

For the cyclist there is an exact seat height that yields the greatest amount of propulsion from the bicycle. A system that immediately positions the seat post into this personalized, exact height reduces time that would otherwise be spent making readjustments.

Heretofore, there are various designs that intend to quickly adjust a cycles seat height. Patents by Cienfuegos, U.S. Pat. No. 5,044,592, Teckenbrock, U.S. Pat. No. 4,807,856, DeFreitas, U.S. Pat. No. 5,826,935, Ganaja, U.S. Pat. No. 5,149,034, and Zurfluh, U.S. Pat. No. 5,713,555 all posses an upwardly urging spring mechanism and a post locking means.

SUMMARY OF THE INVENTION

The object of the present invention is to provide a bicycle-type seat height adjusting assembly that quickly adjusts to lock at a full range of seat heights.

Another object of the present invention is to provide a seat height adjusting assembly that is operable while the cyclist has both hands placed on the handlebars of the bicycle.

Another object of the present invention is to create a seat height adjusting assembly that is resilient to impeding debris such as dirt or sand, and contains a locking mechanism that is both durable and reliable.

Another object of the present invention is to provide a seat height adjusting assembly that contains an easily adjustable means for setting the seat posts maximum seat height, so that the cyclist may quickly locate their most efficient position.

BRIEF DESCRIPTION OF THE DRAWINGS

FIG. 2 is an enlarged sectioned side view of the seat post assembly illustrated in FIG. 1;

FIG. 3 is a horizontal cross-sectional view of FIG. 2 taken on line 3—3;

FIG. 4 is a horizontal cross-sectional view of the lower section of FIG. 2 taken on line 4—4;

FIG. 5 is a view similar to FIG. 2 of another embodiment of the invention;

FIG. 6 is a view similar to FIG. 2 of another embodiment of the invention

FIGS. 7 is a sectioned side view of another embodiment of the invention;

FIG. 8 is a horizontal cross-sectional view of FIG. 7 taken on line 8—8;

FIG. 9 is a similar to FIG. 7 of another embodiment of the invention;

FIG. 10 is an enlarged, horizontal cross-sectional view of FIG. 9 taken on line 10—10;

FIG. 11 is a longitudinal sectioned view of another embodiment of the invention;

FIG. 12 is a horizontal cross-sectional view of FIG. 11 taken on lines 12—12.

Like parts are referred to by like reference numerals.

DESCRIPTION OF THE PREFERRED EMBODIMENTS

Figure 1:
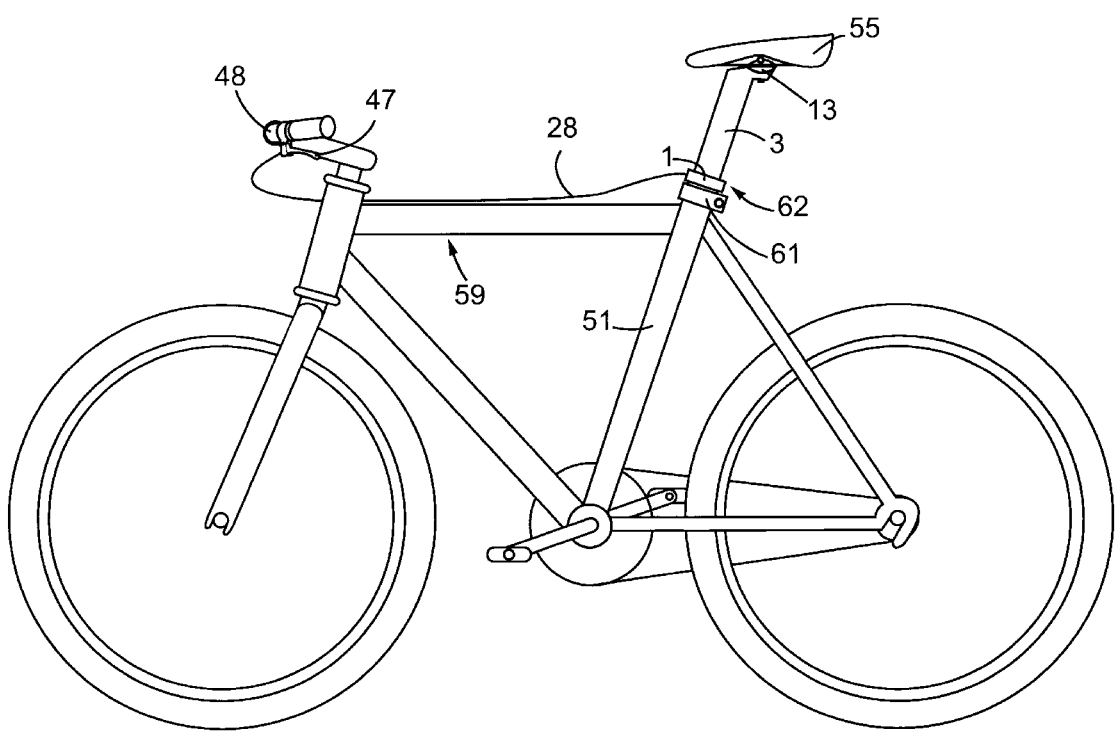
FIG. 1 is a side elevational view of a bicycle equipped with a seat position adjusting assembly according to one embodiment of this invention.

Referring now to the embodiment of the invention shown in FIGS. 1 through 4 thereof, a new seat height positioning assembly generally designated by the reference numeral 62 is shown in FIG. 1 inserted into the seat tube 51 of a bicycle frame 59. The adjustable seat height assembly 62 generally comprises a seat post 3 and an insert sleeve member 1 that is cylindrical in configuration. Connected to the inner wall 63 of the insert sleeve 1 is a support key 2 that contains the seat post locking pin 15 and supplemental spring 16. The locking pin 15 is connected by a cable 17, to an actuating lever 47. The actuating lever 47 is positioned on the bicycle handlebar 48. The seat positioning assembly 62 also comprises a main elastic spring 7, a maximum height set peg 20, and a seat post stabilizing spring 19. The seat 55 is clamped to the top portion 13 of the seat post 3 through any conventional method.

The insert sleeve 1 retrofits into a bicycle frame seat tube 51 in the place of the traditional seat post. The insert sleeve member 1 has a slight collar 18 at the upper portion that acts to limit the insert sleeve 1 from sliding entirely into the bicycle frame seat tube 51. A post clamp 61 is engageable around the seat tube 51 of the bicycle frame 59 for fixedly securing the insert sleeve 1 with respect to the seat tube 51.

The seat post 3 is adjustable up and down, being telescopically slidable within the insert sleeve 1. A first keyway 4 extends longitudinally within the front of the seat post 3. A second keyway 11, narrower then the first, extends longitudinally along the opposite side of the seat post 3. The second keyway 11 may posses a partial or complete back wall 22 for added strength to the seat post 3. A recess 53 defined by spaced parallel walls 56,56, within the lower section of the seat post 3, extends through the seat post 3 to connect the first keyway 4 and second keyway 11. Along the first keyway 4, is a rack of post holes 12 for the locking pin 15 to lock into.

The support key 2, generally rectangular in shape, is welded longitudinally to the inner wall 63 of the insert sleeve member 1. The support key 2 slides within the first keyway 4 to prevent the seat post 3 from rotating.

A floating pulley 6 is positioned within the outwardly open recess 53 and restrained against movement in side directions by walls 56,56. The floating pulley 6 is mounted for rotational movement about a pin 54 that is secured within the seat post 3.

The elastic-spring 7 has a first crimp 8 attached at one end and a second crimp 9 attached to the other end. The first crimp 8 is positioned within a generally rectangular recess 10 that extends horizontally through the lower section of the support key. An outwardly open, vertically formed slot 70 extends though the lower section of the support key. A portion of the elastic spring 7 that extends from the first crimp 8 is positioned within supplemental slot 70. The first crimp is formed wider than the supplemental slot 70 is formed. The first crimp 8 is therefore unable to pass through the supplemental slot 70 to securely hold the first crimp 8 within the rectangular recess 10. The elastic spring 7 extends below the support key 2 and further extends down the first keyway 4. The elastic spring 7 bends around the floating pulley 6 and then extends up the second keyway 11, whereat the second crimp 9 is positioned into a downward pointing hole 27 that is formed within the seat post 3, at the top portion of the second keyway 11. The downward pulling force of the elastic spring 7 keeps the second crimp 9 from rising out of the downward pointing hole 27 to securely hold the second crimp 9 in the downward pointing hole 27. As the seat post 3 is pressed downward by the force of the cyclists buttocks, the elastic spring 7 is stretched from where it is connected to the support key 2, as the floating pulley 6 is pressed downward on the elastic spring 7. The portion of the elastic spring 7 that is positioned along the second keyway 9 is stretched and drawn around the floating pulley 6 as the seat post 3 is pressed downward. When the cyclist rises off the seat, the elastic spring 7 contracts to thereby lift the floating pulley 6 and therefore lift the seat post 3, upwards.

The locking pin 15 and supplemental spring 16 are slidably receivable within an inwardly open bore 14 that extends through the support key 2 and is aligned with the receiving post holes 12. The supplemental spring 16 is positioned between the end platform 65 of the bore 14 and the locking pin 15. The bore 14 may extend into the collar 18. A tube 60 may be placed within or surrounding a portion of the supplemental spring 16 to limit the compression of the supplemental spring 16. A cable 17 is connected to the locking pin 15. The cable 17 passes from the locking pin 15, through the supplemental spring 16, through a hole 71 in the collar section 18, then passes through a protective tube 28, and attaches to an actuating lever 47 located on the bicycles handle bars 48.

When the cyclist pulls the actuating lever 47, the locking pin 15 is pulled into its open position shown in broken lines in FIG. 3. The locking pin 15 is therefore disengaged from one of the post holes 12 and the seat post 3 is urged upward by the force of the elastic spring 7. After adjusting the height of the seat post 3 with the cyclists buttocks the cyclist releases the lever 47, allowing the supplemental spring 16 to return the locking pin 15 to the locked position shown in solid lines in FIG. 3 where the locking pin 15 is positioned into one of the seat post 3 post holes 12.

A stabilizing leaf spring 19 presses from the support key 2, against the first keyway wall 57, to add a feel of solidness to the device. Another embodiment of the stabilizing spring 19, could be an elastomer or soft rubber piece that is equally placed on, or partially within, the support key 2.

The maximum height set peg 20 is used to set the seat post 3 at a maximum seat height limitation. The peg 20 is slidably receivable within any one of the postholes 12 and extends out almost to the bicycle frame seat tube 51. The insert sleeve 1 may posses a slot 50 extending longitudinally beneath the support key 2, along the insert sleeve 1, allowing the maximum height set peg 20 to slide up to the bottom of the support key 2. The peg 20, may be squared off in the section that rests in the first keyway 4 and may have a hole 42 that allows the elastic spring 7 to pass through. The maximum height set peg 20 therefore stops the upward motion of the seat post 3, when the peg 20 contacts the support key 2. The maximum height set peg 20 may be designed through many other methods that should be covered herein.

FIG. 5 is the same as the embodiment in FIG. 1–3, with a few exceptions. The seat post 3 possesses a back wall 22 creating a tubular section 29 in place of a rear keyway 11. In another embodiment of the elastic spring 7 and floating pulley mechanism, a coil spring 24 extends from the bottom platform 25, of a longer insert sleeve 21 that contains a spring guide 23. The spring 29 extends up to the top platform 26 of the seat post rear tubular section 29, where the spring 29 pushes the seat post 3 upwardly. In another embodiment of the maximum height set peg 20, a second peg 30 fits into any one of the post holes 12 and contains a bolt 31 that tightens against the wall of any one of the post holes 12, to keep the second peg 30 in place.

Another embodiment of the device shown in FIGS. 6 is the same as FIGS. 1–5 with a few exceptions. The supplemental spring 16 and locking pin 15 are also slidably receivable in a second bore 43 that is contiguous with first bore 14 and formed within a frontal extension 36 of the collar 18. Actuation of the lever 47 retracts the cable 17 thereby disengaging the locking pin 15 from one of the post holes 12. In this unlocked position the seat post 3 may be readjusted whereupon releasing the lever 47 will re-lock the seat 55 at a new height as described above for the FIG. 1–5 embodiments.

The embodiment shown in FIGS. 7,8 is the same as that shown in FIGS. 1–5 with a few exceptions. Instead of using a locking pin 15, a pawl 32 that has a hook 33 positioned on the outer, lower portion of the pawl 32, is used to contain both the upward and downward movement of the seat post 3. The pawl 32 is slidably receivable within a generally rectangular recess 49, defined by spaced parallel walls 64,64, that extends through the support key 2 and is set in alignment with the post holes 12. The pawl 32 is mounted for pivotal movement about a pin 44 that is secured horizontally within the support key 2. A supplemental spring 16, positioned between the end platform 68 of the recess 49 and the pawl 32, urges the pawl 32 forward, biased towards the post holes 12. The top portion 45 of the pawl 32 engages a post hole 12 as the seat post 3 moves downwardly, combined with the hook 33 that engages a post hole 12 as the seat post 3 moves upwardly, therefore locking the seat post 3 at a given height. The pawl 32 is connected to a cable 17 that extends to an actuating lever 47.

When the cyclist pulls the actuating lever 47, the pawl 32 is pulled into its open position shown in broken lines in FIG. 7. The pawl 32 is therefore disengaged from one of the post holes 12 and the seat post 3 is urged upward by the force of the elastic spring 7 or by the coil spring 24 depicted in FIG. 5. After adjusting the height of the seat post 3 with the cyclists buttocks, the cyclist releases the lever 47 allowing the supplemental spring 16 to return the pawl 32 to the locked position shown in solid lines in FIGS. 7,8, where the pawl 32 is positioned into one of the post holes 12.

FIGS. 9,10 present another embodiment of a locking pawl, the same as FIGS. 7,8, with a few exceptions. The top portion 45 of the second pawl 34 engages a post hole 12 as the seat post 3 moves downward, combined with a loosely attached supplemental pin 35, instead of the hook 33, that is biased to engage a post hole 12 as the seat post 3 moves upwardly, thereby locking the seat post 3 into place. The supplemental pin 35 slides in parallel spaced linear groves 46,46 along the inner walls 64,64 of recess 49. The supplemental pin 35, urged forward by supplemental spring 16, is connected to a cable 17 that slides within a protective tube 28, and is attached to an actuating lever 47. Actuation of the lever 47 retracts the cable 17 thereby disengaging the second pawl 34 and supplemental pin 35 combination from one of the post holes 12. In this unlocked position the seat post 3 may be readjusted whereupon releasing the lever 47 will re-lock the seat 55 at a new height as described above for the FIG. 7 embodiment.

In another embodiment of the invention shown in FIGS. 11,12 the seat post 3 has a plurality of holes 12 extending longitudinally along the front tine of the seat post 3. A spring 24, attached to the bottom platform 25 of the insert sleeve 21, extends up a central opening 29 in the seat post 3 and presses against the top platform 26 of the post opening 29, to therefore urge the seat post 3 upwardly. The seat post 3 axially slides within the insert sleeve 21 that retrofits into the seat tube 51 of a bicycle 59, in the place of the traditional seat post. At the upper portion of the insert sleeve 21 is a collar 18 that limits the insertion of the insert sleeve 21 into the cycle frame's seat tube 51. An inwardly open bore 39, aligned with the post holes 12 and formed within the frontal extension 37 of the collar 18, supports the slidably receivable locking pin 15 and supplemental spring 16. The supplemental spring 16 is positioned between the end platform 66 of the bore 39 and the locking pin 15. The locking pin 15 is connected to a cable that passes through a hole 54, narrower in diameter and aligned with the bore 39, that extends through the frontal extension 37 of the collar 18. The cable is attached to an actuating lever positioned on the bicycle 59 handlebar 47. The seat post 3 has flat surfaces 40,40, positioned longitudinally along opposite sides of the seat post 3 that limit the rotation of the seat post 3 relative to the insert sleeve 21, by engaging correlating edges 41,41, formed within the insert sleeve 21. A maximum height set peg 20 fits into any one of the post holes 12. Positioned within one of the post holes 12, the maximum height set peg 20 extends out almost to the bicycle seat tube 51 and slides within a slot 50 that extends through and is positioned longitudinally along the insert sleeve 21. The maximum height set peg 20 thereby stops the upward movement of the seat post 3, when the maximum height set peg 20 engages the top surface 52 of the slot 50.

When the cyclist pulls the actuating lever 47, the locking pin 15 is pulled into its open position shown in broken lines in FIG. 12. The locking pin 15 is therefore disengaged from one of the post holes 12 and the seat post 3 is urged upward by the force of the spring 24. After adjusting the height of the seat post 3 with the cyclists buttocks the cyclist releases the lever 47 allowing the supplemental spring 16 to return the locking pin 15 to the locked position shown in solid lines in FIG. 12 where the locking pin 15 is positioned into one of the post holes 12.

A boot type device (not shown) may cover the seat post 3 by being connected to the collar 18 at the boots lower portion and connected to the post top 13 at the boots upper section, through any conventional boot attaching means.

What is claimed is:

1. A bicycle-type seat height adjusting assembly comprising:

an insert sleeve sized to be slidably receivable within a seat tube of a bicycle-type apparatus, said insert sleeve member having an outer collar section to limit the degree to which said insert sleeve will having into the bicycle seat tube;

an axially slidable seat post positionable to different heights within said insert sleeve and adapted to support a bicycle seat at the top portion of said seat post;

a first keyway longitudinally formed along the front of said seat post;

a support key affixed longitudinally to the inner wall of said insert sleeve;

said support key being loosely guided within the inner walls that define said keyway to prevent said seat post against rotation;

a main spring positioned substantially within said insert sleeve unit urging said seat post upwardly relative to said insert sleeve unit;

a plurality of evenly spaced post holes formed along said front keyway;

a locking means substantially contained within said support key and operably associated with said seat post to be adjusted by disengaging said locking device from said post holes whereby said seat post is slidably adjusted into position by the operator between locking position;

a cable extending from said locking means to an actuating lever positioned on the bicycle to retract said locking means;

a hole extending through said collar section, along a line extending radially to said seat posts central axis to enable said cable to pass through said collar;

a maximum height set means for said seat post substantially comprising a peg sized to be slidably receivable within any of said post holes, a portion of said peg positioned in said key way to limit the upward movement of said seat post upon said peg engaging said support key, whereby the operator is able to limit the post from rising beyond an exact, personally set, optimum height.

2. A bicycle-type seat height adjusting assembly comprising:

an insert sleeve sized to be slidably receivable within the seat tube of a bicycle-type apparatus, said insert sleeve member having an outer collar section to limit the degree to which said insert sleeve will insert into the bicycle seat tube;

a support key affixed longitudinally to the inner wall of said insert sleeve;

an axially slidable seat post positioned within said insert sleeve, able to be set at varying levels, having means of supporting a bicycle seat at the top portion of said seat post;

a first keyway longitudinally positioned along the front of said seat post, which said support key slides in, said first keyway horizontally extending through said seat post at said seat posts lower section;

a second keyway longitudinally positioned along the rear of said seat post, said second keyway connected to said first keyway at said lower section;

a floating pulley positioned within said lower section of said first keyway;

an elastic spring first attached to the upper rear section of said seat post, said elastic spring traveling down said second keyway of said seat post, bending around said pulley, extending up said first keyway and is secondly attached to the lower section of said support key, urging said seat post upwardly relative to said support key;

a plurality of post holes formed along said seat posts first keyway;

a bore extending through said support key, along a line extending radially to said seat posts central axis;

a lock means including a locking pin and a supplemental spring device is slidably receivable within said bore, said supplemental spring urging said locking pin into any one of said post holes to therefore lock said seat post at a given height, wherein the height of the seat is adjusted when said locking pin is disengaged from said seat post and said seat post is placed into position by the cyclists' buttocks between locked position;

a cable is attached to said locking pin and is attached to an actuating lever on the bicycle, as a means of retracting said locking pin;

a hole narrower in diameter then and aligned with said bore, extending through said collar to allow said cable to pass through said collar;

a maximum height set means for said seat post substantially comprising a peg sized to be slidably receivable within any of said post holes, a portion of said peg positioned in said first keyway to limit the upward movement of said seat post upon engaging said support key, whereby the operator is able to limit the post from rising beyond an exact, personally set, optimum height.

3. A bicycle-type seat height adjusting assembly according to claim 2, wherein said bore extends into a contiguous bore in said collar section.

4. A bicycle-type seat height adjusting assembly according to claim 3, wherein said second keyway further comprises a back wall to form a tubular section.

* * * * *